(12) United States Patent
Yi et al.

(10) Patent No.: US 11,183,331 B2
(45) Date of Patent: Nov. 23, 2021

(54) MLCC MODULE AND METHOD OF MANUFACTURING THE SAME

(71) Applicant: SAMSUNG ELECTRO-MECHANICS CO., LTD., Suwon-si (KR)

(72) Inventors: Jae Seok Yi, Suwon-si (KR); Jung Min Kim, Suwon-si (KR); Chang Hak Choi, Suwon-si (KR); Bon Seok Koo, Suwon-si (KR); Byung Woo Kang, Suwon-si (KR); Hae Sol Kang, Suwon-si (KR); San Kyeong, Suwon-si (KR); Jun Hyeon Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 189 days.

(21) Appl. No.: 16/537,847

(22) Filed: Aug. 12, 2019

(65) Prior Publication Data

US 2020/0273621 A1 Aug. 27, 2020

(30) Foreign Application Priority Data

Feb. 21, 2019 (KR) .................. 10-2019-0020596
Apr. 16, 2019 (KR) .................. 10-2019-0044182

(51) Int. Cl.
*H01G 4/232* (2006.01)
*H01G 4/30* (2006.01)
(Continued)

(52) U.S. Cl.
CPC .......... *H01G 4/2325* (2013.01); *H01G 4/0085* (2013.01); *H01G 4/012* (2013.01);
(Continued)

(58) Field of Classification Search
CPC ............ H01G 4/30; H01G 4/12; H01G 4/248; H01G 4/012; H01G 4/1209; H01G 4/232;
(Continued)

(56) References Cited

U.S. PATENT DOCUMENTS 5,339,068 A * 8/1994 Tsunoda .................. H01C 1/02
338/308
2014/0290999 A1 10/2014 Park et al.
(Continued)

FOREIGN PATENT DOCUMENTS

JP 2008-071926 A 3/2008
JP 2018-73900 A 5/2018
(Continued)

OTHER PUBLICATIONS

Korean Office Action dated Jun. 9, 2020 issued in Korean Patent Application No. 10-2019-0044182 (with English translation).

*Primary Examiner* — Michael P McFadden
(74) *Attorney, Agent, or Firm* — Morgan, Lewis & Bockius LLP (57) ABSTRACT

A multilayered capacitor includes a shock absorbing layer disposed between an upper layer of a capacitor body and a conductive resin layer of an external electrode and between a lower layer of the capacitor body and the conductive resin layer of the external electrode. A length of the shock absorbing layer is longer than that of the conductive resin layer, thereby improving warpage strength characteristics of the capacitor body.

23 Claims, 6 Drawing Sheets

(51) Int. Cl.
  *H01G 4/248* (2006.01)
  *H01G 4/012* (2006.01)
  *H01G 4/008* (2006.01)
  *H01G 4/12* (2006.01)

(52) U.S. Cl.
  CPC .............. *H01G 4/248* (2013.01); *H01G 4/30* (2013.01); *H01G 4/1227* (2013.01)

(58) Field of Classification Search
  CPC ... H01G 4/0085; H01G 4/1227; H01G 4/2325
  See application file for complete search history.

(56) References Cited

U.S. PATENT DOCUMENTS

| | | | |
|---|---|---|---|
| 2015/0022945 A1* | 1/2015 | Park | H01G 4/30 361/301.4 |
| 2015/0124370 A1 | 5/2015 | Ahn et al. | |
| 2016/0211078 A1* | 7/2016 | Park | H01G 4/38 |
| 2018/0040426 A1* | 2/2018 | Wakashima | H01G 4/232 |
| 2018/0114644 A1 | 4/2018 | Sugita | |
| 2018/0144867 A1 | 5/2018 | Park et al. | |

FOREIGN PATENT DOCUMENTS

| | | |
|---|---|---|
| KR | 10-2014-0118213 A | 10/2014 |
| KR | 10-2015-0051667 A | 5/2015 |
| KR | 10-2018-0058021 A | 5/2018 |

\* cited by examiner

MLCC MODULE AND METHOD OF MANUFACTURING THE SAME

CROSS-REFERENCE TO RELATED APPLICATION(S)

This application claims benefit of priority to Korean Patent Application No. 10-2019-0020596 filed on Feb. 21, 2019 and Korean Patent Application No. 10-2019-0044182 filed on Apr. 16, 2019 in the Korean Intellectual Property Office, the disclosures of which are incorporated herein by reference in their entireties.

BACKGROUND

1. Field

The present disclosure relates to a multilayer capacitor.

2. Description of Related Art

A multilayer capacitor has a small size and high capacitance and is easily mounted. Therefore, such a multilayer capacitor is commonly mounted on the printed circuit boards of several electronic products such as image display apparatuses, for example, liquid crystal displays (LCD), plasma display panels (PDP), or the like, computers, smartphones, cellular phones, and the like, to serve to charge or discharge electricity therein or therefrom.

Recently, high warpage strength characteristics for the multilayer capacitor have been demanded, and in particular, in accordance with an increase in an interest in electrical components in the industry, multilayer capacitors have also been expected to have high reliability and high strength characteristics in order to be used in a vehicle or an infotainment system.

In order to achieve high reliability in a passive component, high reliability against mechanical stress is continuously required. Particularly, a new method rendering the multilayer capacitor for electrical components resistant to strong vibrations of a vehicle body is required.

SUMMARY

An aspect of the present disclosure may provide a multilayer capacitor with improved warpage strength characteristics.

According to an aspect of the present disclosure, a multilayer capacitor has a shock absorbing layer disposed between an upper layer of a capacitor body and a conductive resin layer of an external electrode and between a lower layer of the capacitor body and the conductive resin layer of the external electrode, and a length of the shock absorbing layer is longer than that of the conductive resin layer.

The multilayer capacitor may include a capacitor body including dielectric layers, and first internal electrodes and second internal electrodes alternately disposed with each of the dielectric layers interposed therebetween. The capacitor body has first and second surfaces opposing each other, third and fourth surfaces connected to the first and second surfaces and opposing each other in a first direction, and fifth and sixth surfaces connected to the first and second surfaces, connected to the third and fourth surfaces, and opposing each other. One end of each of the first and second internal electrodes is exposed through a respective one of the third and fourth surfaces. First and second external electrodes are disposed on respective opposite end portions of the capacitor body opposing each other in the first direction, and are connected to the first and second internal electrodes, respectively. The first external electrode includes a first conductive resin layer disposed on the first and second surfaces of the capacitor body, and a first shock absorbing layer is disposed between the first surface of the capacitor body and the first conductive resin layer and between the second surface of the capacitor body and the first conductive resin layer. The second external electrode includes a second conductive resin layer disposed on the first and second surfaces of the capacitor body, and a second shock absorbing layer is disposed between the first surface of the capacitor body and the second conductive resin layer and between the second surface of the capacitor body and the second conductive resin layer. A length of each of the first and second shock absorbing layers measured in the first direction on the first and second surfaces of the capacitor body is longer than a length of each of the first and second conductive resin layers measured in the first direction on the first and second surfaces of the capacitor body.

The first external electrode may include a first conductive layer disposed on the third surface of the capacitor body, the first shock absorbing layer disposed on the first, second, fifth, and sixth surfaces of the capacitor body, and the first conductive resin layer covering the first conductive layer and extending to portions of the first, second, fifth, and sixth surfaces of the capacitor body to partially cover the first shock absorbing layer. The second external electrode may include a second conductive layer disposed on the fourth surface of the capacitor body, the second shock absorbing layer disposed on the first, second, fifth, and sixth surfaces of the capacitor body to be spaced apart from the first shock absorbing layer in the first direction, and the second conductive resin layer covering the second conductive layer and extending to portions of the first, second, fifth, and sixth surfaces of the capacitor body to partially cover the second shock absorbing layer.

The first and second conductive layers may include copper (Cu).

The first and second conductive resin layers may include a conductive metal and epoxy.

The first and second conductive resin layers may include an intermetallic compound and epoxy.

The first and second shock absorbing layers may be formed of an insulating material.

The first and second shock absorbing layers may include epoxy.

The first and second shock absorbing layers may include a metal and a filler.

A content of metal of the first and second shock absorbing layers may be 50 wt % or less, based on a total weight of each of the first and second shock absorbing layers, and the filler may include silica, glass, and zirconium dioxide ($ZrO_2$).

A sum of the lengths of the first and second shock absorbing layers in the first direction may be 90% or less of a length of the capacitor body in the first direction.

A thickness of each of the first and second shock absorbing layers may be 10 μm or more.

The multilayer capacitor may further include plating layers covering the first and second conductive resin layers.

The plating layers may include first and second nickel (Ni) plating layers respectively covering the first and second conductive resin layers, and first and second tin (Sn) plating layers respectively covering the first and second nickel plating layers.

In accordance with another aspect of the disclosure, a multilayer capacitor may include a body including pluralities of first and second internal electrodes alternately stacked with dielectric layers therebetween, and first and second external electrodes respectively disposed on third and fourth surfaces of the body opposing each other in a length direction, and respectively connected to the first internal electrodes exposed through the third surface of the body and to the second internal electrodes exposed through the fourth surface of the body. Each of the first and second external electrodes includes a conductive resin layer disposed on first and second opposing surfaces of the capacitor body to be spaced apart from the first and second opposing surfaces by a shock absorbing layer that is disposed therebetween, that has a lower conductivity than the conductive resin layer, and that has a longer length in the length direction on the first or second surface than the conductive resin layer.

The conductive resin layer of each of the first and second external electrodes may not contact either of the first or second opposing surface of the capacitor body.

The shock absorbing layer of each of the first and second external electrodes may directly contact dielectric layers of the body on each of the first and second opposing surfaces of the capacitor body.

Each of the first and second external electrodes may further include a conductive layer disposed on the respective third and fourth surfaces of the body, and the conductive resin layer may extend to and contact the conductive layer on the respective third and fourth surfaces of the body.

The third and fourth surfaces of the body may be free of the shock absorbing layers of the first and second external electrodes.

In accordance with a further aspect of the disclosure, a multilayer capacitor may include a body including pluralities of first and second internal electrodes alternately stacked with dielectric layers therebetween, and having first and second opposing surfaces, third and fourth opposing surfaces, and fifth and sixth opposing surfaces. First and second external electrodes are respectively disposed on third and fourth surfaces of the body opposing each other in a length direction, and are respectively connected to the first internal electrodes exposed through the third surface of the body and to the second internal electrodes exposed through the fourth surface of the body. Each of the first and second external electrodes includes a conductive layer disposed on a respective one of the third and fourth surfaces of the body, and a conductive resin layer covering the conductive layer on the respective one of the third and fourth surfaces of the body and extending therefrom to the first, second, fifth, and sixth surfaces of the body. The conductive resin layer of each of the first and second external electrodes is spaced apart from the body by a respective shock absorbing layer that is disposed between the conductive resin layer and the first and second surfaces of the body and that extends on the first and second surfaces by a length in the length direction greater than the conductive resin layer.

The shock absorbing layers of the first and second external electrodes may be spaced apart from each other on the first and second surfaces of the body, and a sum of lengths of the shock absorbing layers of the first and second external electrodes on the first and second surfaces of the body is less than 90% of a length of the body in the length direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Hereinafter, directions of a capacitor body 110 will be defined in order to clearly describe exemplary embodiments in the present disclosure. X, Y and Z in the drawings refer to a length direction, a width direction, and a thickness direction of the capacitor body 110, respectively. In addition, in the present exemplary embodiment, the Z direction refers to a stacking direction in which dielectric layers are stacked.

Figure 1:
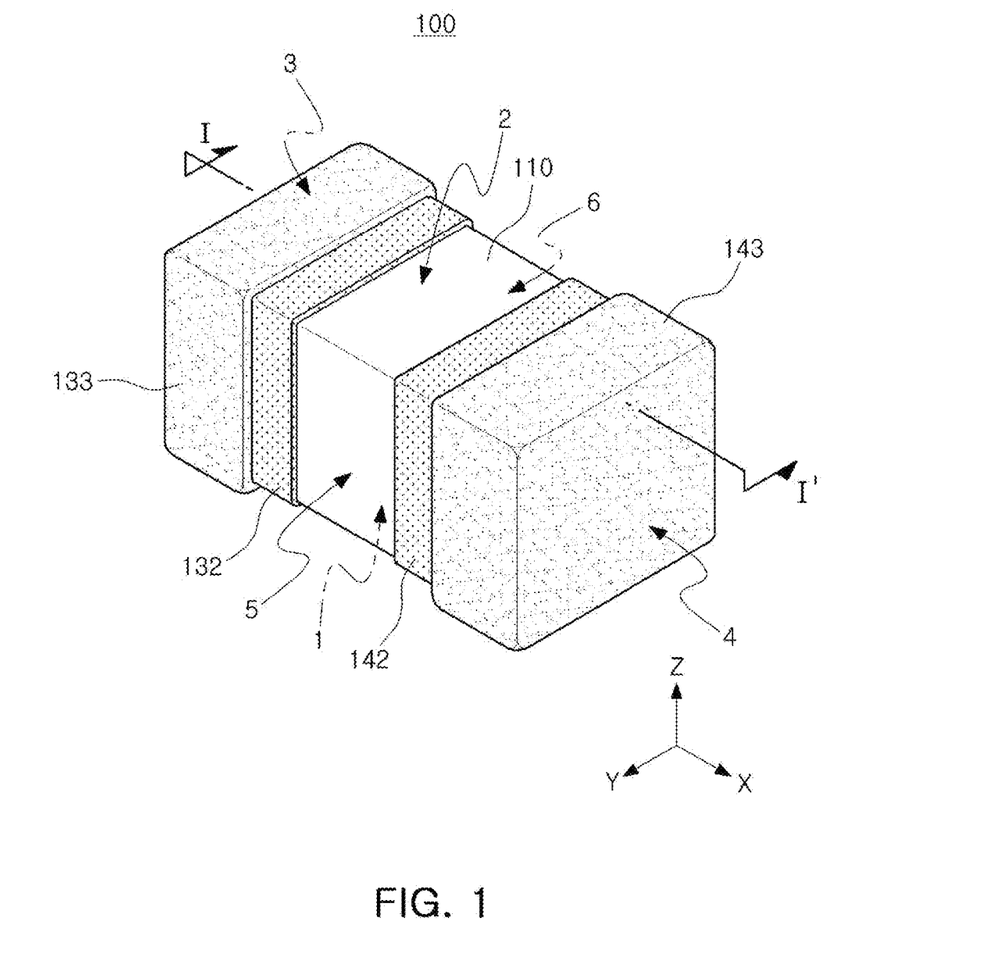
FIG. 1 is a perspective view schematically illustrating a multilayer capacitor according to an exemplary embodiment in the present disclosure.
Figure 2:
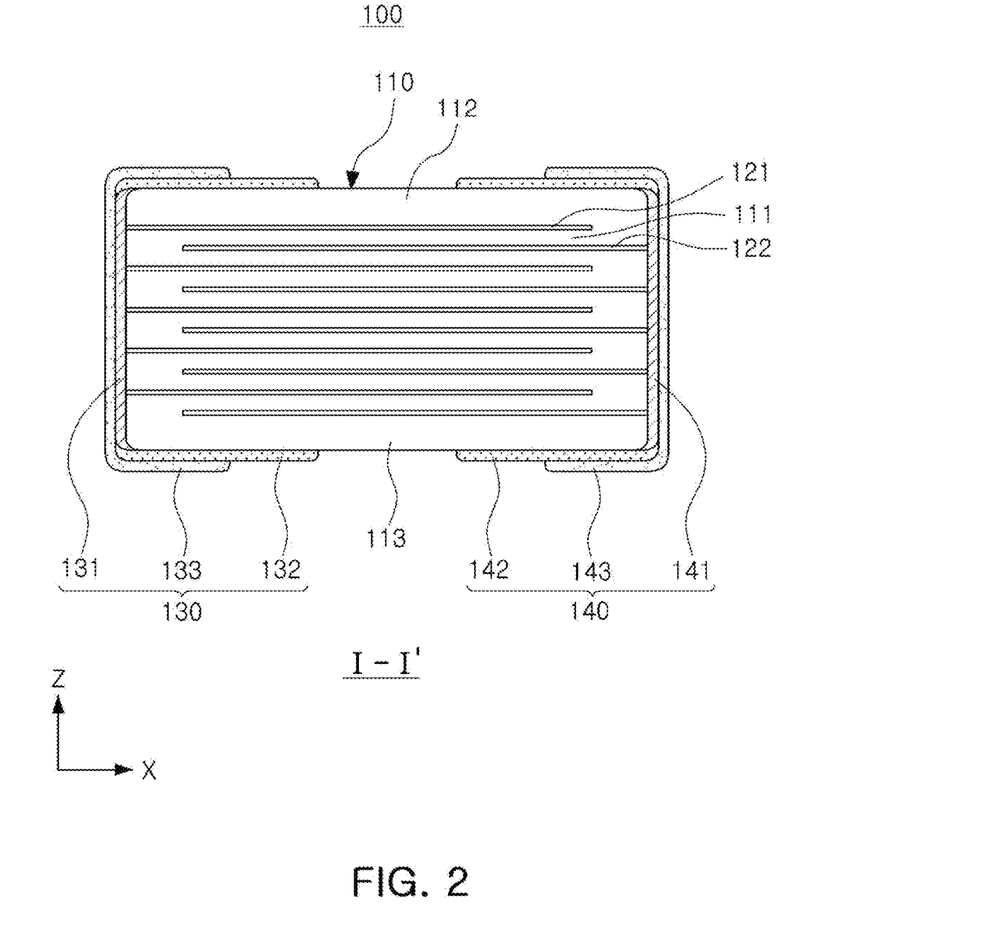
FIG. 2 is a cross-sectional view taken along line I-I' of FIG. 1.
Figure 3:
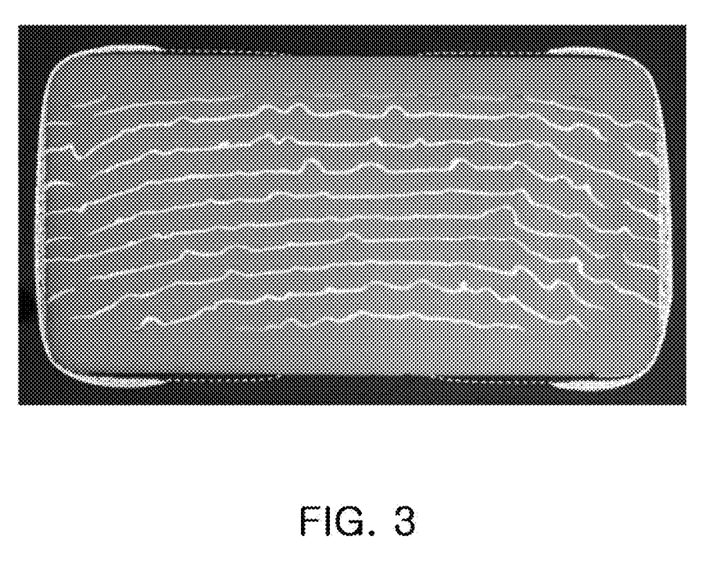
FIG. 3 is a photograph showing a cross section of the multilayer capacitor of FIG. 1.

FIG. 1 is a perspective view schematically illustrating a multilayer capacitor according to an exemplary embodiment in the present disclosure, FIG. 2 is a cross-sectional view taken along line I-I' of FIG. 1, and FIG. 3 is a photograph showing a cross section of the multilayer capacitor of FIG. 1.

Referring to FIGS. 1 through 3, a multilayer capacitor 100 according to the present exemplary embodiment may include the capacitor body 110 and first and second external electrodes 130 and 140.

The capacitor body 110 may be formed by stacking and then sintering a plurality of dielectric layers 111 in the Z direction, and adjacent dielectric layers 111 of the capacitor body 110 may be integrated with each other so that boundaries therebetween are not readily apparent without using a scanning electron microscope (SEM).

In this case, the capacitor body 110 may have a substantially hexahedral shape. However, a shape of the capacitor body 110 is not limited thereto. Further, a shape and a dimension of the capacitor body 110 and the number of stacked dielectric layers 111 are not limited to those illustrated in the drawings according to the present exemplary embodiment.

In the present exemplary embodiment, for convenience of explanation, first and second surfaces 1 and 2 of the capacitor body 110 refer to opposite surfaces of the capacitor body 110 opposing each other in the Z direction, third and fourth surfaces 3 and 4 of the capacitor body 110 refer to opposite surfaces of the capacitor body 110 connected to the first and second surfaces 1 and 2 and opposing each other in the X direction, and fifth and sixth surfaces 5 and 6 of the capacitor body 110 refer to opposite surfaces of the capacitor body 110 connected to the first and second surfaces 1 and 2, connected to the third and fourth surfaces 3 and 4, and opposing each other in the Y direction.

Further, in the present exemplary embodiment, a mounting surface of the multilayer capacitor 100 may be the first surface 1 which is a lower surface of the capacity body 110 in the drawings.

The dielectric layers 111 may include a ceramic material having a high dielectric constant, such as barium titanate ($BaTiO_3$)-based ceramic powder particles, strontium titanate ($SrTiO_3$)-based ceramic powder particles, or the like. However, a material of the dielectric layers 111 is not limited thereto as long as a sufficient capacitance may be obtained.

In addition, the dielectric layers 111 may further include a ceramic additive, an organic solvent, a plasticizer, a binder, a dispersant, and the like, in addition to the ceramic powder particles.

Examples of the ceramic additive may include a transition metal oxide or a transition metal carbide, a rare earth element, magnesium (Mg), aluminum (Al), or the like.

The capacitor body 110 may include an active region, which contributes to forming a capacitance of the capacitor, and upper and lower covers 112 and 113 formed as upper and lower margin portions on upper and lower surfaces of the active region, respectively.

The upper and lower covers 112 and 113 may be formed of the same material as that of the dielectric layers 111 and have the same configuration as that of the dielectric layers 111 except that they do not include internal electrodes.

The upper and lower covers 112 and 113 may be formed by stacking a single dielectric layer or two or more dielectric layers on the upper and lower surfaces of the active region, respectively, in the Z direction, and may basically serve to prevent damage to first and second internal electrodes 121 and 122 due to physical or chemical stress.

The first and second internal electrodes 121 and 122, which are electrodes to which different polarities are applied, may be alternately disposed to face each other in the Z direction with each of the dielectric layers 111 interposed therebetween, and one end of each of the first and second internal electrodes 121 and 122 may be exposed through a respective one of the third and fourth surfaces 3 and 4 of the capacitor body 110.

Here, the first and second internal electrodes 121 and 122 may be electrically insulated from each other by the dielectric layers 111 disposed therebetween.

The end portions of the first and second internal electrodes 121 and 122 exposed through the third and fourth surfaces 3 and 4 of the capacitor body 110, respectively, may be electrically connected to first and second external electrodes 130 and 140 disposed on the third and fourth surfaces 3 and 4 of the capacitor body 110 to be described below, respectively.

According to the configuration as described above, when predetermined voltages are applied to the first and second external electrodes 130 and 140, electric charges may be accumulated between the first and second internal electrodes 121 and 122.

In this case, a capacitance of the multilayer capacitor 100 may be in proportion to an area of portions of the first and second internal electrodes 121 and 122 overlapping each other in the Z direction in the active region.

In addition, a material used to form the first and second internal electrodes 121 and 122 is not particularly limited, but may be a conductive paste formed of at least one selected from the group consisting of, for example, a noble metal material such as platinum (Pt), palladium (Pd), or a palladium-silver (Pd—Ag) alloy, nickel (Ni), and copper (Cu).

In this case, a method for printing the conductive paste may be a screen printing method, a gravure printing method, or the like, but is not limited thereto.

Voltages having different polarities may be provided to the first and second external electrodes 130 and 140, respectively, and the first and second external electrodes 130 and 140 may be disposed on opposite end portions of the capacitor body 110 in the X direction, respectively, and may be electrically connected to exposed portions of the first and second internal electrodes 121 and 122, respectively.

In this case, the first and second external electrodes 130 and 140 may include first and second conductive layers 131 and 141, first and second shock absorbing layers 132 and 142, and first and second conductive resin layers 133 and 143, respectively.

The first conductive layer 131 may be formed on the third surface 3 of the capacitor body 110 and may be connected to (e.g., in contact with) the first internal electrodes 121.

The second conductive layer 141 may be formed on the fourth surface 4 of the capacitor body 110 and may be connected to (e.g., in contact with) the second internal electrodes 122.

Further, the first and second conductive layers 131 and 141 may include a metal such as copper (Cu).

The first shock absorbing layer 132 may be disposed on the first and second surfaces 1 and 2, and the fifth and sixth surfaces 5 and 6 of the capacitor body 110.

Further, a length of the first shock absorbing layer 132 in the X direction may be longer than a length of the first conductive resin layer 133 on the first and second surfaces 1 and 2 and the fifth and sixth surfaces 5 and 6 in the X direction to be described later.

In this case, the length of the first shock absorbing layer 132 (e.g., in the X direction) may be 1.0 or more times the electrode size predetermined for each type of multilayer capacitors, and a thickness of the first shock absorbing layer 132 may be 10 μm or more.

The second shock absorbing layer 142 may be formed on the first and second surfaces 1 and 2, and the fifth and sixth surfaces 5 and 6 of the capacitor body 110, and may be disposed to be spaced apart from the first shock absorbing layer 132 in the X direction.

Further, a length of the second shock absorbing layer 142 in the X direction may be longer than a length of the second conductive resin layer 143 on the first and second surfaces 1 and 2 and the fifth and sixth surfaces 5 and 6 in the X direction to be described later.

In this case, the length of the second shock absorbing layer 142 (e.g., in the X direction) may be 1.0 or more times the electrode size predetermined for each type, and a thickness of the second shock absorbing layer 142 may be 10 μm or more.

The first and second shock absorbing layers 132 and 142 may be formed of an elastic material, for example, a polymer or the like.

In addition, the first and second shock absorbing layers 132 and 142 may be formed of an insulating material. In this case, the first and second shock absorbing layers 132 and 142 may include epoxy.

As another example, the first and second shock absorbing layers 132 and 142 may include a metal and a filler. The filler may serve to improve applicability and adjust a mechanical strength.

In this case, a content of metal may be 50 wt % or less, based on the total weight of each of the first and second absorbing layers 132 and 142, and the filler may include non-metallic materials such as silica, glass, and zirconium dioxide ($ZrO_2$).

Further, the filler may further include a predetermined amount of metallic material and various organic matters.

The filler may serve to adjust applicability, heat resistance, adhesiveness, and the like at the time of initially forming the first and second shock absorbing layers 132 and 142.

In addition, the first and second shock absorbing layers 132 and 142 may be disposed to be spaced apart from each other by a predetermined distance on the surfaces of the capacitor body 110 in order to prevent the first and second shock absorbing layers 132 and 142 from adhering to each other.

In this case, the sum of lengths of the first and second shock absorbing layers 132 and 142 in the X direction may be 90% or less of a length of the capacitor body 110 in the X direction.

In a case in which the sum of the lengths of the first and second shock absorbing layers 132 and 142 exceeds 90% of the length of the capacitor body 110 in the X direction, the first and second shock absorbing layers may be connected to each other.

The first conductive resin layer 133 may serve to improve stability of the multilayer capacitor against mechanical stress. The first conductive resin layer 133 may be formed to extend from the third surface 3 of the capacitor body 110 to portions of the first, second, fifth, and sixth surfaces 1, 2, 5 and 6, so as to cover (e.g., fully cover) the first conductive layer 131, and to partially cover the first shock absorbing layer 132.

The first shock absorbing layer 132 may be disposed between the first surface 1 of the capacitor body 110 and the first conductive resin layer 133 and between the second surface 2 of the capacitor body 110 and the first conductive resin layer 133.

The second conductive resin layer 143 may serve to improve stability of the multilayer capacitor against mechanical stress. The second conductive resin layer 143 may be formed to extend from the fourth surface 4 of the capacitor body 110 to portions of the first, second, fifth, and sixth surfaces 1, 2, 5, and 6, so as to cover (e.g., fully cover) the second conductive layer 141, and to partially cover the second shock absorbing layer 142.

The second shock absorbing layer 142 may be disposed between the first surface 1 of the capacitor body 110 and the second conductive resin layer 143 and between the second surface 2 of the capacitor body 110 and the second conductive resin layer 143.

In addition, the first and second conductive resin layers 133 and 143 may include a conductive metal and epoxy. In this case, the conductive metal may be copper, nickel, or the like.

Further, as another example, the first and second conductive resin layers 133 and 143 may include an intermetallic compound and epoxy.

Figure 6:
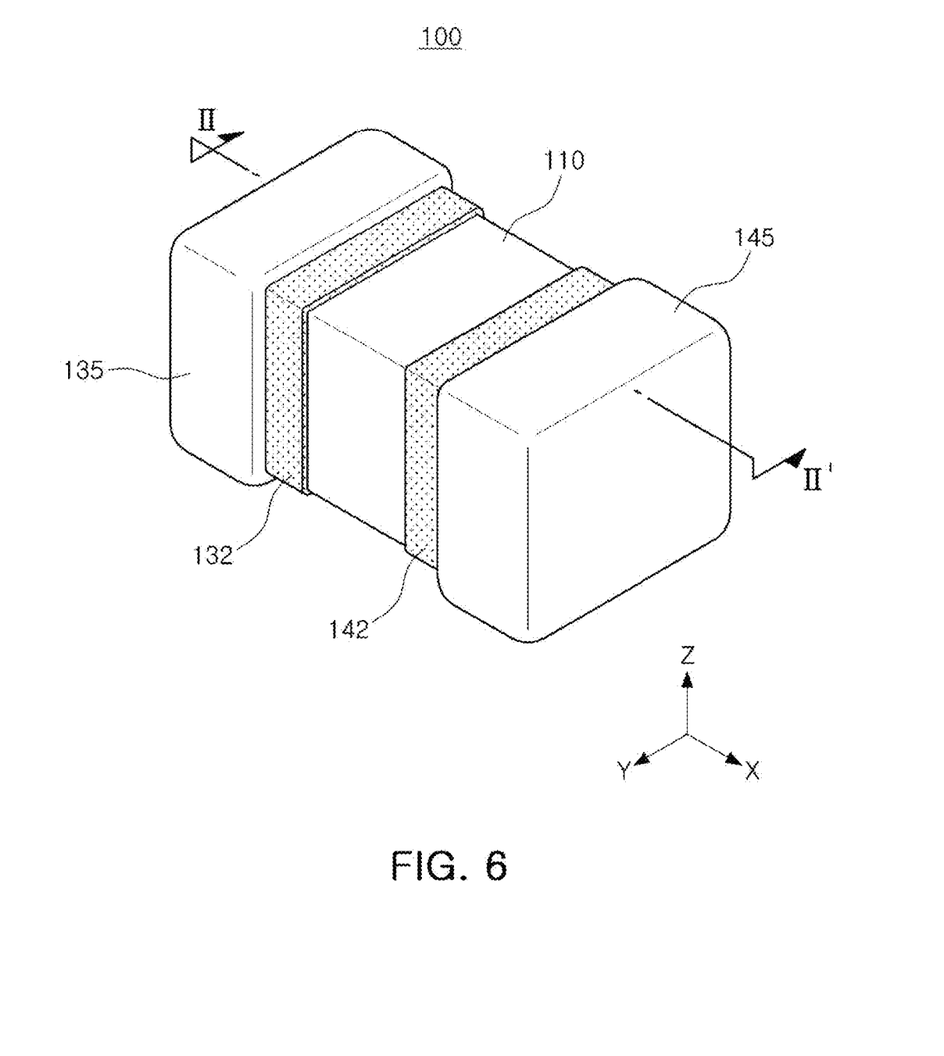
FIG. 6 is a perspective view illustrating plating layers further formed on external electrodes of the multilayer capacitor of FIG. 1.
Figure 7:
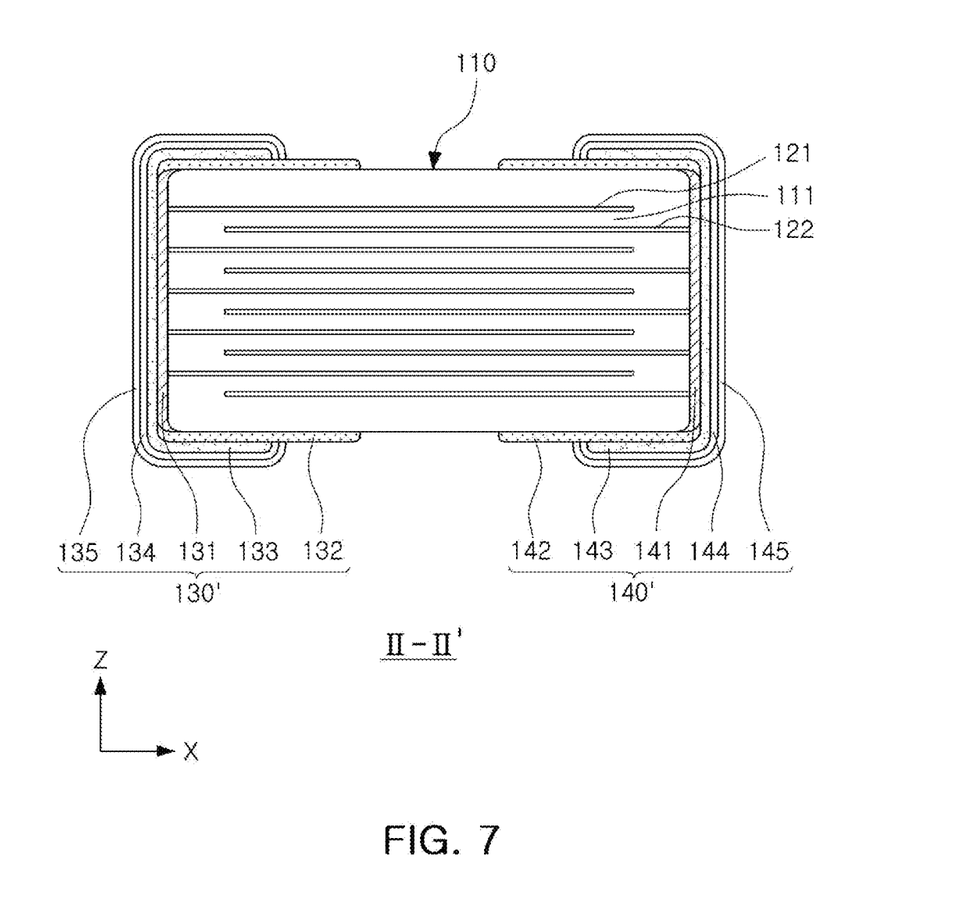
FIG. 7 is a cross-sectional view illustrating the plating layers of the multilayer capacitor of FIG. 6.

Meanwhile, as illustrated in FIGS. 6 and 7, the first and second external electrodes 130 and 140 may further include plating layers. The plating layers are formed to cover the first and second conductive resin layers 133 and 143.

The plating layers may include first and second nickel (Ni) plating layers 134 and 144 respectively covering the first and second conductive resin layers 133 and 143, and first and second tin (Sn) plating layers 135 and 145 respectively covering the first and second nickel plating layers 134 and 144.

The multilayer capacitor according to the related art uses an external electrode layer formed of only a metal having a low elastic modulus and thus is vulnerable to external mechanical stress.

In order to solve such a problem, a method of applying a resin-based metal paste in which a resin with high ductility and metal particles are mixed has been disclosed. However, a standard for the multilayer capacitor for electrical components, which requires higher reliability, is still not satisfied.

In addition, a trade-off situation, in which an external electrode using the resin-based metal paste has increased ductility and decreased electrical connectivity, or has decreased ductility and increased electrical connectivity depending on a content of metal, may occur.

Such a problem may be solved by a method of controlling a structure, for example, a method of increasing a length of a band of an electrode, instead of a method of changing a composition of the external electrode. However, in a case in which the length of the band is increased, an interval between two electrodes is decreased and a possibility that a short circuit of an element occurs is increased accordingly. Therefore, in practice, it is difficult to apply the method of controlling a structure.

In the present disclosure, a structure of the external electrode is specified in order to manufacture a multilayer capacitor with high stability against mechanical stress.

According to an exemplary embodiment in the present disclosure, a layer using a resin-based material in an external electrode of a multilayer capacitor may be configured to have a double layer structure with different compositions, thereby allowing the multilayer capacitor be operated more stably against external mechanical stress.

That is, in the present exemplary embodiment, the external electrode may include no or less metal component and may have a double layer structure including a shock absorbing layer having high ductility and a conductive resin layer having slightly low ductility and excellent electrical connectivity, such that an effect of increasing mechanical stability and securing electrical connectivity of the multilayer capacitor may be expected.

In addition, according to the present exemplary embodiment, a length of a band of the shock absorbing layer may be longer than a length of the conductive resin layer formed on an outer side of the shock absorbing layer, unlike the general multilayer capacitor, such that mechanical stress applied to the capacitor body may be further decreased.

In this case, the conductive resin layer has a certain level or higher of electrical connectivity, and thus the multilayer capacitor may be designed to be operated without any problem.

In addition, a short circuit of the multilayer capacitor which may occur may be prevented by adjusting the lengths of the bands of the shock absorbing layers and the conductive resin layers so that a predetermined distance between the shock absorbing layers spaced apart from each other is maintained.

As described above, according to the present exemplary embodiment, an effect of improving reliability of the multilayer capacitor against mechanical stress while maintaining a certain level of electrical connectivity and stability under accelerated lifespan testing may be expected.

Experimental Example

Figure 4:
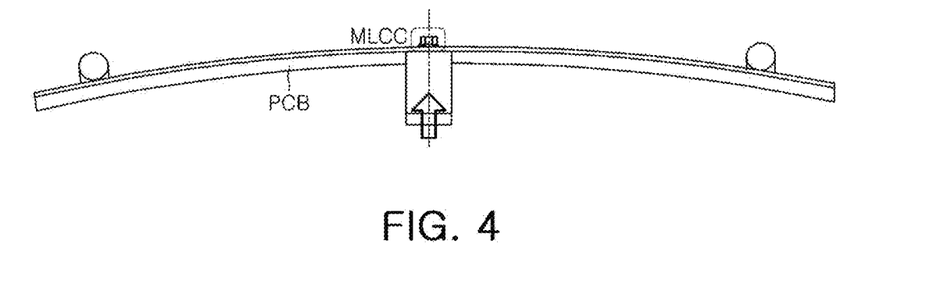
FIG. 4 is a front view illustrating a bending test method for the multilayer capacitor.
Figure 5:
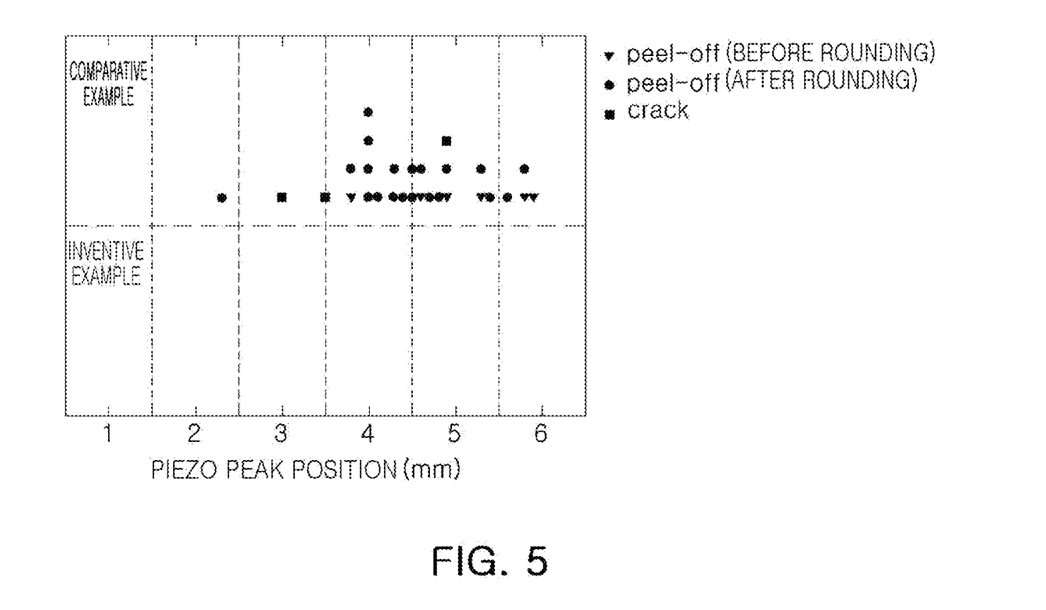
FIG. 5 is a graph showing results of a bending test using the bending test method of FIG. 4.

FIG. 4 is a front view for describing a bending test method for the multilayer capacitor, and FIG. 5 is a graph illustrating a result of a bending test using the bending test method of FIG. 4.

FIG. 4 illustrates a test of a crack occurrence frequency of a capacitor body depending on whether or not the shock absorbing layer is applied, and FIG. 5 illustrates a result thereof.

Here, a Comparative Example is a multilayer capacitor in which the shock absorbing layer is not applied to the external electrode, and an Inventive Example is a multilayer capacitor having a structure in which the external electrode includes the shock absorbing layer as illustrated in FIG. 1.

Referring to FIG. 4, the crack occurrence frequency may be measured in a manner in which a board on which the multilayer capacitor is mounted is positioned on a device that may press a mounting surface of the board, a surface opposite to the mounting surface on which the multilayer capacitor is mounted is pressed downward by 6 mm to check whether or not a warpage crack occurs.

Referring to FIG. 5, in the Comparative Example in which the shock absorbing layer is not applied, 29 samples among 30 samples had a peel-off defect in which the band is peeled-off from the capacitor body or a crack defect in which the capacitor body is cracked.

However, in the Inventive Example in which the shock absorbing layer is applied, no sample among 30 samples had any defect and thus it may be appreciated that a warpage strength may be secured under the 6 mm warpage strength test.

As set forth above, according to the exemplary embodiments in the present disclosure, the warpage strength characteristics of the multilayer capacitor may be improved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a capacitor body including dielectric layers, and first internal electrodes and second internal electrodes alternately disposed with each of the dielectric layers interposed therebetween, and having first and second surfaces opposing each other, third and fourth surfaces connected to the first and second surfaces and opposing each other in a first direction, and fifth and sixth surfaces connected to the first and second surfaces, connected to the third and fourth surfaces, and opposing each other, wherein one end of each of the first and second internal electrodes is exposed through a respective one of the third and fourth surfaces; and
first and second external electrodes disposed on respective opposite end portions of the capacitor body opposing each other in the first direction, and connected to the first and second internal electrodes, respectively,
wherein the first external electrode includes a first conductive resin layer disposed on the first and second surfaces of the capacitor body, and a first shock absorbing layer disposed between the first surface of the capacitor body and the first conductive resin layer and between the second surface of the capacitor body and the first conductive resin layer,
the second external electrode includes a second conductive resin layer disposed on the first and second surfaces of the capacitor body, and a second shock absorbing layer disposed between the first surface of the capacitor body and the second conductive resin layer and between the second surface of the capacitor body and the second conductive resin layer,
a length of each of the first and second shock absorbing layers measured in the first direction on the first and second surfaces of the capacitor body is longer than a length of each of the first and second conductive resin layers measured in the first direction on the first and second surfaces of the capacitor body, and
at least one of the first shock absorbing layer or the second shock absorbing layer comprises discrete first and second portions disposed on the first and second surfaces, respectively.

2. The multilayer capacitor of claim 1, wherein the first external electrode includes a first conductive layer disposed on the third surface of the capacitor body, the first shock absorbing layer disposed on the first, second, fifth, and sixth surfaces of the capacitor body, and the first conductive resin layer covering the first conductive layer and extending to portions of the first, second, fifth, and sixth surfaces of the capacitor body to partially cover the first shock absorbing layer, and
the second external electrode includes a second conductive layer disposed on the fourth surface of the capacitor body, the second shock absorbing layer disposed on the first, second, fifth, and sixth surfaces of the capacitor body to be spaced apart from the first shock absorbing layer in the first direction, and the second conductive resin layer covering the second conductive layer and extending to portions of the first, second, fifth, and sixth surfaces of the capacitor body to partially cover the second shock absorbing layer.

3. The multilayer capacitor of claim 2, wherein the first and second conductive layers include copper (Cu).

4. The multilayer capacitor of claim 1, wherein the first and second conductive resin layers include a conductive metal and epoxy.

5. The multilayer capacitor of claim 1, wherein the first and second conductive resin layers include an intermetallic compound and epoxy.

6. The multilayer capacitor of claim 1, wherein the first and second shock absorbing layers are formed of an insulating material.

7. The multilayer capacitor of claim 6, wherein the first and second shock absorbing layers include epoxy.

8. The multilayer capacitor of claim 1, wherein the first and second shock absorbing layers include a metal and a filler.

9. The multilayer capacitor of claim 8, wherein a content of metal of the first and second shock absorbing layers is 50 wt % or less, based on a total weight of each of the first and second shock absorbing layers, and the filler includes silica, glass, and zirconium dioxide ($ZrO_2$).

10. The multilayer capacitor of claim 1, wherein a sum of the lengths of the first and second shock absorbing layers in the first direction is 90% or less of a length of the capacitor body in the first direction.

11. The multilayer capacitor of claim 1, wherein a thickness of each of the first and second shock absorbing layers is 10 μm or more.

12. The multilayer capacitor of claim 1, further comprising plating layers covering the first and second conductive resin layers.

13. The multilayer capacitor of claim 12, wherein the plating layers include first and second nickel (Ni) plating layers respectively covering the first and second conductive resin layers, and first and second tin (Sn) plating layers respectively covering the first and second nickel plating layers.

14. The multilayer capacitor of claim 1, wherein the first external electrode includes a first conductive layer disposed on the third surface of the capacitor body, the first shock absorbing layer having a composition different than that of the first conductive layer, or the second external electrode includes a second conductive layer disposed on the fourth surface of the capacitor body, the second shock absorbing layer having a composition different than that of the second conductive layer.

15. A multilayer capacitor comprising:

a body including pluralities of first and second internal electrodes alternately stacked with dielectric layers therebetween, and first and second external electrodes respectively disposed on third and fourth surfaces of the body opposing each other in a length direction, and respectively connected to the first internal electrodes exposed through the third surface of the body and to the second internal electrodes exposed through the fourth surface of the body, wherein each of the first and second external electrodes includes a conductive resin layer disposed on first and second opposing surfaces of the capacitor body so as to be spaced apart from the first and second opposing surfaces by a shock absorbing layer that is disposed therebetween, that has a lower conductivity than the conductive resin layer, and that has a longer length in the length direction on the first or second surface than the conductive resin layer.

16. The multilayer capacitor of claim 15, wherein the conductive resin layer of each of the first and second external electrodes does not contact either of the first or second opposing surface of the capacitor body.

17. The multilayer capacitor of claim 15, wherein the shock absorbing layer of each of the first and second external electrodes directly contacts dielectric layers of the body on each of the first and second opposing surfaces of the capacitor body.

18. The multilayer capacitor of claim 15, wherein each of the first and second external electrodes further includes a conductive layer disposed on the respective third and fourth surfaces of the body, and the conductive resin layer extends to and contacts the conductive layer on the respective third and fourth surfaces of the body.

19. The multilayer capacitor of claim 18, wherein the third and fourth surfaces of the body are free of the shock absorbing layers of the first and second external electrodes.

20. The multilayer capacitor of claim 15, wherein at least one of the first or second external electrode further includes a conductive layer, having a composition different than that of the shock absorbing layer, disposed on the respective third or fourth surface of the body.

21. A multilayer capacitor comprising:

a body including pluralities of first and second internal electrodes alternately stacked with dielectric layers therebetween, and having first and second opposing surfaces, third and fourth opposing surfaces, and fifth and sixth opposing surfaces, and first and second external electrodes respectively disposed on third and fourth surfaces of the body opposing each other in a length direction, and respectively connected to the first internal electrodes exposed through the third surface of the body and to the second internal electrodes exposed through the fourth surface of the body, wherein each of the first and second external electrodes includes a conductive layer disposed on a respective one of the third and fourth surfaces of the body, and a conductive resin layer covering the conductive layer on the respective one of the third and fourth surfaces of the body and extending therefrom to the first, second, fifth, and sixth surfaces of the body, wherein the conductive resin layer of each of the first and second external electrodes is spaced apart from the body by a respective shock absorbing layer that is disposed between the conductive resin layer and the first and second surfaces of the body and that extends on the first and second surfaces by a length in the length direction greater than the conductive resin layer, and at least one of the respective shock absorbing layers comprises discrete first and second portions disposed on the first and second surfaces, respectively.

22. The multilayer capacitor of claim 21, wherein the shock absorbing layers of the first and second external electrodes are spaced apart from each other on the first and second surfaces of the body, and a sum of lengths of the shock absorbing layers of the first and second external electrodes on the first and second surfaces of the body is less than 90% of a length of the body in the length direction.

23. The multilayer capacitor of claim 21, wherein at least one of the respective shock absorbing layers has a composition different than that of the conductive layer.

* * * * *